United States Patent
Bucheru

(10) Patent No.: US 9,531,299 B2
(45) Date of Patent: Dec. 27, 2016

(54) RESONANT SINGLE STAGE DC-AC CONVERTER WITH CAPACITORS FORMING A HALF-BRIDGE

(71) Applicant: DET International Holding Limited, Grand Cayman (KY)

(72) Inventor: Bogdan Tudor Bucheru, San Jose, CA (US)

(73) Assignee: DET INTERNATIONAL HOLDING LIMITED, Grand Cayman (KY)

( * ) Notice: Subject to any disclaimer, the term of this patent is extended or adjusted under 35 U.S.C. 154(b) by 107 days.

(21) Appl. No.: 14/368,429

(22) PCT Filed: Dec. 28, 2012

(86) PCT No.: PCT/IB2012/003021
§ 371 (c)(1),
(2) Date: Jun. 24, 2014

(87) PCT Pub. No.: WO2013/098647
PCT Pub. Date: Jul. 4, 2013

(65) Prior Publication Data
US 2014/0334215 A1    Nov. 13, 2014

Related U.S. Application Data

(60) Provisional application No. 61/580,946, filed on Dec. 28, 2011.

(51) Int. Cl.
H02M 7/5387    (2007.01)
H02M 3/335    (2006.01)
(Continued)

(52) U.S. Cl.
CPC ............. *H02M 7/5387* (2013.01); *H02M 1/44* (2013.01); *H02M 3/33584* (2013.01);
(Continued)

(58) Field of Classification Search
CPC ....... H02M 7/538; H02M 7/539; H02M 3/335
(Continued)

(56) References Cited

U.S. PATENT DOCUMENTS 1,876,451 A    9/1932    Telefunken
4,301,404 A    11/1981   Ley
(Continued)

FOREIGN PATENT DOCUMENTS

DE    10112892 A2    10/2002
EP    0507360 A2    10/1992
(Continued)

OTHER PUBLICATIONS

European Patent Office Search Report, Mar. 23, 2015, 10 pages, Application No. EP 13405056.6.
(Continued)

*Primary Examiner* — Adolf Berhane
*Assistant Examiner* — Nusrat Quddus
(74) *Attorney, Agent, or Firm* — Robert S. Babayi; Vector IP Law Group

(57) ABSTRACT

A new and useful circuitry for DC to AC single stage conversion are presented, with the advantages of bi-directionality, resonant power transfer, high efficiency and simplicity. The output voltage dual polarity is achieved by means of control, synchronizing the output switch with one or the other of the primary switches. The invention also provides the means of canceling the common noise of the magnetic transformer.

6 Claims, 11 Drawing Sheets

(51) Int. Cl.
*H02M 7/48* (2007.01)
*H02M 1/44* (2007.01)
*H02M 7/538* (2007.01)

(52) U.S. Cl.
CPC ......... *H02M 7/4807* (2013.01); *H02M 7/538* (2013.01); *H02M 2007/4815* (2013.01); *Y02B 70/1433* (2013.01); *Y02B 70/1441* (2013.01)

(58) Field of Classification Search
USPC ............................... 363/95, 97, 98, 131–133
See application file for complete search history.

(56) References Cited

U.S. PATENT DOCUMENTS

| | | | |
|---|---|---|---|
| 4,479,175 A | | 10/1984 | Gille et al. |
| 5,712,772 A | * | 1/1998 | Telefus et al. ............. 363/21.02 |
| 6,172,882 B1 | * | 1/2001 | Tanaka et al. .................. 363/17 |
| 6,462,962 B1 | * | 10/2002 | Cuk ........................ H02M 1/34 363/131 |
| 6,949,915 B2 | * | 9/2005 | Stanley ............... H02M 1/4208 323/207 |
| 7,869,230 B2 | * | 1/2011 | Huang ................ H02M 3/1582 363/132 |
| 7,957,160 B2 | * | 6/2011 | Babcock et al. ................. 363/16 |
| 8,395,910 B2 | * | 3/2013 | Alexander ...................... 363/17 |
| 8,780,588 B2 | * | 7/2014 | Teraura et al. ............ 363/21.02 |
| 2002/0057261 A1 | * | 5/2002 | An et al. ....................... 345/179 |
| 2002/0159281 A1 | * | 10/2002 | Furukawa ........... H02M 7/5387 363/132 |
| 2002/0172062 A1 | * | 11/2002 | Furukawa et al. ............ 363/132 |
| 2004/0119576 A1 | | 6/2004 | Nakao |
| 2004/0232845 A1 | | 11/2004 | Baarman |
| 2005/0140482 A1 | | 6/2005 | Cheng |
| 2007/0183176 A1 | * | 8/2007 | Eguchi et al. ................ 363/131 |
| 2010/0244775 A1 | * | 9/2010 | Smith ........................... 320/140 |
| 2010/0308939 A1 | | 12/2010 | Kurs |
| 2012/0081934 A1 | | 4/2012 | Garrity et al. |
| 2012/0087157 A1 | | 4/2012 | Huang et al. |
| 2013/0044519 A1 | * | 2/2013 | Teraura ............. H02M 3/33584 363/17 |
| 2014/0226385 A1 | * | 8/2014 | Shiji ............................ 363/131 |
| 2015/0002068 A1 | * | 1/2015 | Durham et al. .............. 318/503 |
| 2015/0015181 A1 | * | 1/2015 | Kondo ............. H02M 3/33584 320/103 |

FOREIGN PATENT DOCUMENTS

| | | |
|---|---|---|
| EP | 1011187 A1 | 6/2000 |
| EP | 1634366 A1 | 3/2006 |
| EP | 2172952 A1 | 4/2010 |
| EP | 2196351 A1 | 6/2010 |
| GB | 2458476 A | 9/2009 |
| JP | 2001076598 A | 3/2001 |
| JP | 2009123727 A | 6/2009 |
| JP | 2011142177 A | 7/2011 |
| WO | 9948130 A1 | 9/1999 |
| WO | 0116995 A1 | 3/2001 |
| WO | 2008140333 A2 | 11/2008 |
| WO | 2009111597 A2 | 9/2009 |
| WO | 2010/090538 A1 | 8/2010 |
| WO | 2010090538 A1 | 8/2010 |
| WO | 2010090539 A1 | 8/2010 |
| WO | 2011148289 A2 | 12/2011 |
| WO | 2012008693 A2 | 1/2012 |
| WO | 2012/018268 A1 | 2/2012 |
| WO | 2012018268 A1 | 2/2012 |

OTHER PUBLICATIONS

European Patent Office Search Report, Jun. 23, 2014, 8 pages, Application No. EP 13405055.8.
European Patent Office Search Report, Feb. 11, 2015, Application No. EP 13405054.1.
European Patent Office Search Report, Jan. 13, 2014, Application No. EP 13405057.4.
Fotopoulou K et al., "Wireless Powering of Implanted Sensors using RF Inductive Coupling",Sensors, 2006. 5th IEEE Conference on, IEEE, PI, Oct. 22, 2006 (Oct. 22, 2006), pp. 765-768.
Phadke A G et al., "A New Measurement Technique for Tracking Voltage Phasors, Local System Frequency, and Rate of Change of Frequency", IEEE Transactions on Power Apparatus and Systems, IEEE Inc. New York, US, vol. PAS-100, No. 5, May 1, 1983 (May 1, 1983), pp. 1025-1103.
Budhia M et al: "A new IPT magnetic coupler for electric vehicle charging systems", IECON 2010—36th Annual Conference on IEEE Industrial Electronics Society, IEEE, Nov. 7, 2010, pp. 2487-2492, NJ, USA.
Masato Chigira et al: "Small-size light-weight transformer with new core structure for contactless electric vehicle power transfer system", Energy Conversion Congress and Exposition (ECCE), 2011 IEEE, IEEE, Sep. 17, 2011, pp. 260-266.
European Patent Office Communication Pursuant to Article 94(3) EPC, Jul. 9, 2015, Application No. 13 405 058.2.
Garcia O et al: "Zero Voltage Switching in the PWM Half Bridge Topology With Complementary Control and Synchronous Rectification", Power Electronics Specialists Conference, 1995. New York, NY, USA IEEE, US, vol. 1, Jun. 18, 1995 (Jun. 18, 1995), pp. 286-291.
Hans Ertl et al: "A Novel Multicell DC-AC Converter for Applications in Renewable Energy Systems", IEEE Transactions on Industrial Electronics, IEEE Service Center, Piscataway, NJ, USA, vol. 49, No. 5, Oct. 1, 2002 (Oct. 1, 2002).
Supplementary European Search Report, EP Application No. 12862262, Apr. 1, 2016.
Steigerwald R: "A comparison of half-bridge resonant converter topologies",1987 IEEE Applied Power Electronics Conference and Exposition, IEEE, Mar. 2, 1987 (Mar. 2, 1987), pp. 135-144.

* cited by examiner a)

b)

RESONANT SINGLE STAGE DC-AC CONVERTER WITH CAPACITORS FORMING A HALF-BRIDGE

RELATED APPLICATION/CLAIM OF PRIORITY

The present invention is related to and claims priority from U.S. provisional application Ser. No. 61/580,946, filed Dec. 28, 2011, and entitled Resonant Bi-directional DC-AC Converter, which provisional application is incorporated by reference herein.

INTRODUCTION

Inverters and MicroInverters (DC-AC switching power converters) are becoming very popular in today's industry, as the solar energy conversion is one of the largest Green Energy methods. In the past the DC-AC converters (single or multi-phase) are use mostly for AC motor drives and in most cases did not required electrical isolation. The solar inverters deliver energy into the AC power grid and require an electrical isolation for electrical safety reasons.

Inverters harness the power of many solar panels, processing power above kilowatt level. The MicroInverters harness the power of a single solar panel, thus processing power in the 100 W to 300 W range. As of today the cost per delivered kilowatt is lowest for the higher power inverters, and there is a sustained effort in reducing the cost of the MicroInverters to match up with the cost of the Inverters.

Each solar panel is an individual DC power source, with a relatively low output voltage and the power capability controlled by the amount of solar irradiation received. Because the inverter needs to deliver the energy in a relatively high voltage AC form (AC power grid), a power conversion has to be performed between low DC voltage and high AC voltage. The power factor of the DC-AC converter needs to be very good, in order to maintain the desired characteristic of the AC grid.

For lower power DC-AC converters (MicroInverters) there is a trade off to be made between cost, complexity, and efficiency. The size and weight of the MicroInverter is also very critical, as the device is typically attached onto the solar panel. It is the scope of the invention herein to present a simpler and more efficient way of converting the solar energy of a solar panel, providing a DC-AC converter with reduced weight and size.

The high power inverters take advantage of the high number of solar panels in order to achieve efficient energy harvesting. The solar panel outputs can be connected in series in order to achieve a high voltage DC bus (e.g. 400V), which can be processed easily by a single high power isolated DC-AC stage. The main issue with this approach is the sensitivity of the system due to the malfunction of a single solar panel. One damaged panel or just a partial or total shading of that panel can limit the performance of the entire system.

Furthermore, solar panels require a Maximum Power Point Tracking (MPPT) control in order the deliver the maximum power available from the solar irradiation at any time. Applying MPPT to many in series solar panels at once does not produce the best energy harvest.

Another solution for energy harvesting a high number of solar panels requires individual low voltage isolated DC-DC converters to be connected with the input to each solar panel, and with their output connected in series, providing the high voltage bus necessary to operate one single high power AC-DC stage. This approach brings an improvement because allows the capability of MPPT control for each individual solar panel, therefore improving the energy harvesting. Even so, the system is still sensitive to the failure of individual solar panels and/or DC-DC stages.

The MicroInverter concept attaches one independent DC-AC converter to each solar panel, increasing the flexibility and reliability of the system. The energy harvesting is maximized by the MPPT of each individual solar panel and the failure of one of them does not influence at all the operation of the others.

The conservative designs of a MicroInverter follow those of the Inverters, using multi-stage (at least two stages) concept. That means a step-up DC-DC stage that takes the low voltage provided by the solar panel, and using an isolated high frequency switched transformer creates a high voltage intermediate bus. Then this is further used as the input of a second DC-AC stage that delivers the power to the AC grid. The relatively high complexity of the design leads to high cost, weight and size of the converter.

More recent a single stage design is becoming popular, where an isolated DC-DC stage takes the low DC voltage of a solar panel and converts it into a variable voltage (100 Hz/120 Hz) following the envelope of the rectified AC power line. In order to deliver a real AC sinusoidal voltage to the AC grid, an unfolding bridge (four switches, usually four active semiconductor devices) is added between the output of the DC-DC stage and the AC line.

FIG. 1 presents schematically the single stage concept and its main AC waveforms.

The typical choice for the DC-DC stage is the fly-back topology, known for its simplicity (one primary switch, one transformer and one rectifier device) and its tolerance to large variation of input and output voltages for a given transformer turn-ratio. A fly-back converter can work in continuous mode (CM), discontinuous mode (DM) or critical conduction mode (CrM).

Hard-switching losses of the active devices are high when operating at high frequency and high voltage, therefore efforts were made toward soft-switching solutions, case were the CrM fly-back offers advantages. Resonant topologies, most popular being LLC, can provide both Zero Voltage Switching (ZVS) and/or Zero Current Switching (ZCS), depending on the particular application.

The usual DC-AC converter includes a noise reduction filter on its output (EMI filter), necessary to eliminate the high frequency noise created by the high-frequency switching. EMI filters always include capacitors, which distort the AC line current by changing the current phase in respect with the AC line voltage.

FIG. 2 shows the ideal line current, the phase-shifted capacitive current and the resulted total line current. The distortion of the total current of the AC line leads to a deterioration of the power factor of the DC-AC converter. The normal Fly-back DC-DC stage is uni-directional (power can flow only from the input to its output) and it cannot fully compensate the capacitive current created by the EMI filter. The EMI filter capacitive contribution can be eliminated if a bi-directional power flow is possible.

Fly-back topology makes part from the "single ended" category, where the power is delivered only in one state of the transformer. The majority of resonant solutions are part of the "double ended" category, where the output power is delivered during two of the transformer states. For resonant LLC topology, primary side half-bridge configuration is very popular, requiring only to switches and two capacitors, thus being well suited for double ended secondary side.

For a majority of applications the half-bridge configuration is symmetrical (the average voltage applied on each of the two capacitors is identical and steady) and in some cases the half-bridge is asymmetrical (the average voltage is steady but different between the capacitors).

SUMMARY OF THE PRESENT INVENTION

It is a purpose of the present invention to introduce a new bi-directional single stage concept, which eliminates the unfolding bridge, maintains soft-switching of the active devices during operation, delivering the output power in a resonant way, reduces the common mode noise of the transformer, and increases the overall efficiency.

The present invention provides circuitry for DC to AC conversion using resonant bi-directional single stage, comprising a magnetic transformer T1 that has a primary winding T1:1 connected with a non-dotted end to capacitors C1 and C2 that form the first part of a half-bridge structure, and with a dotted end connected to an small value inductor $L_{LK}$, which is further connected to switches S1 and S2 that form a second part of the said half-bridge structure, and where the T1 transformer has a secondary winding T1:2 connected with the non-dotted end to an AC line phase L and with the dotted end to an output switch So that makes the connection with an AC line phase N.

Preferably, the depending on the polarity of the AC output voltage the So output switch is synchronized with the one or the other of S1 or S2 primary switches. Also, during the output AC voltage zero crossing periods, the output switch So is maintained OFF and the voltage of the capacitive node of the primary bridge (VC) is moved from the last position at the end of the previous AC line semi-cycle to the starting position of the next AC line semi-cycle, by means of varying the switching time of S1 and S2 primary switches.

The present invention also provides circuitry for DC to AC conversion using resonant bi-directional single stage, where a magnetic transformer T1 has a primary winding T1:1 connected with the non-dotted end to capacitors C1 and C2 forming the first part of a half-bridge structure, and with the dotted end connected to an small value inductor $L_{LK}$, which is further connected to switches S1 and S2 forming the second part of the said half-bridge structure, where T1 transformer has two identical windings T1:2 and T1:3, with T1:2 winding being connected with the non-dotted end to the L side of an AC line and with the dotted end to the first side of a switch So, while T1:3 winding is connected with the non-dotted end to the second side of the switch So and with the dotted end to the N side of the AC line. In a preferred version of this circuitry, depending on the polarity of the AC output voltage the So output switch is synchronized with the one or the other of S1 or S2 primary switches. Also, during the output AC voltage zero crossing periods, the output switch So is maintained OFF and the voltage of the capacitive node of the primary bridge (VC) is moved from the last position at the end of the previous AC line semi-cycle to the starting position of the next AC line semi-cycle, by means of varying the switching time of S1 and S2 primary switches.

These and other features of the present invention will become further apparent from the following detailed description and the accompanying drawings

DETAILED DESCRIPTION

As described above, the present invention introduces a new bi-directional single stage concept, which eliminates the unfolding bridge, maintains soft-switching of the active devices during operation, delivering the output power in a resonant way, reduces the common mode noise of the transformer, and increases the overall efficiency.

Resonant Bi-Directional DC-AC Converter

Figure 1:
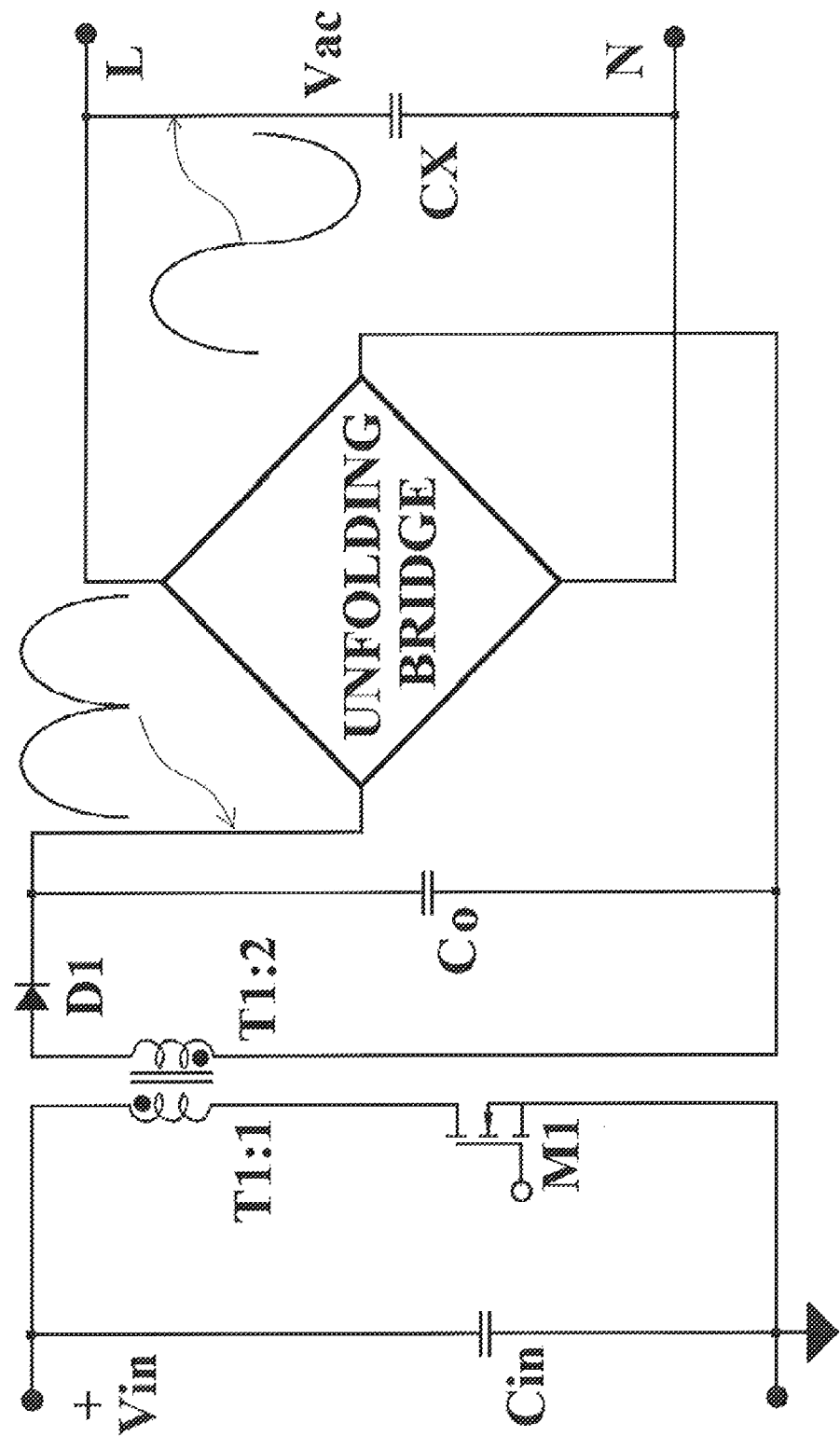
FIG. 1 presents schematically the single stage concept and its main AC waveforms.
Figure 2:
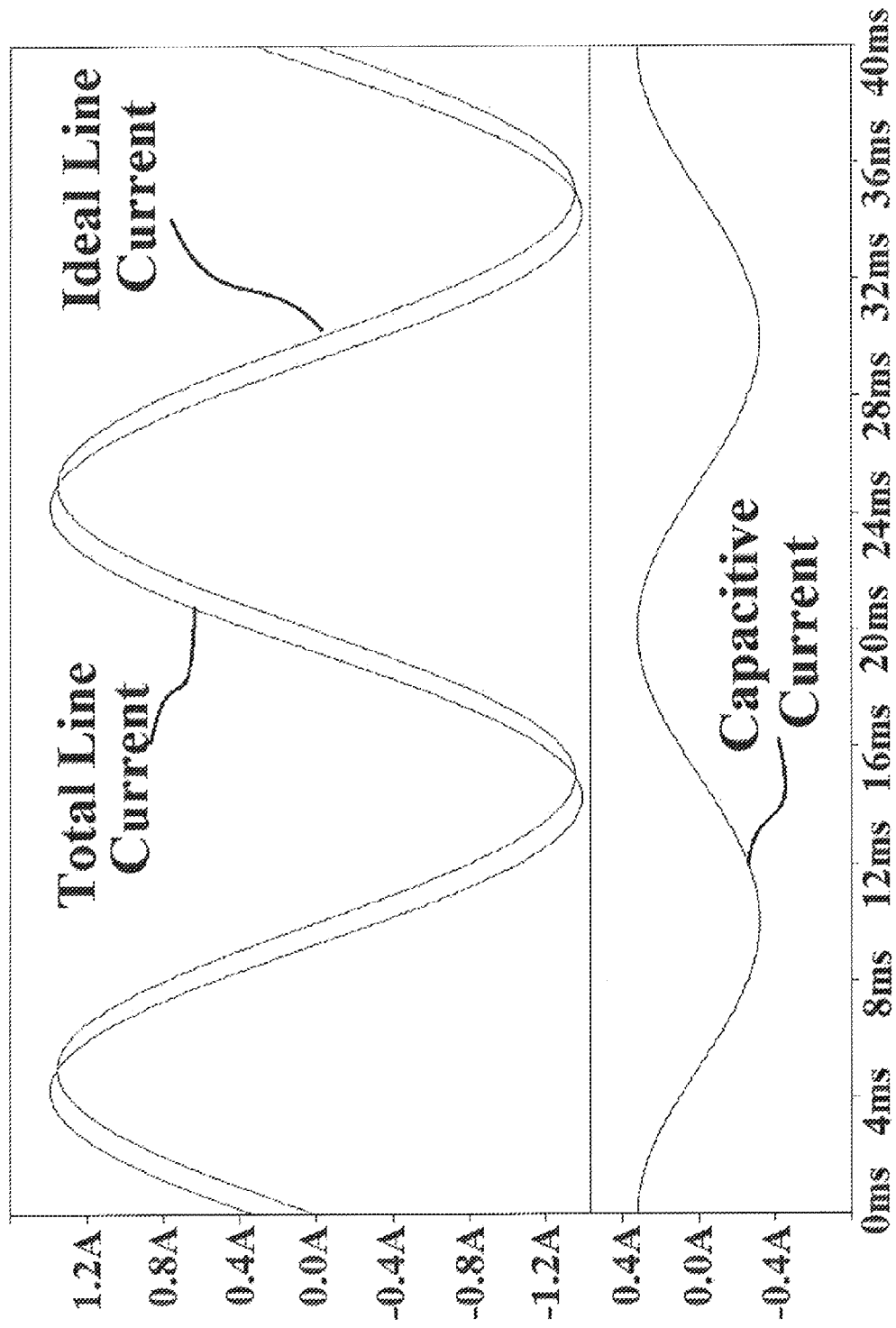
FIG. 2 shows the ideal line current, the phase-shifted capacitive current and the resulted total line current.
Figure 3:
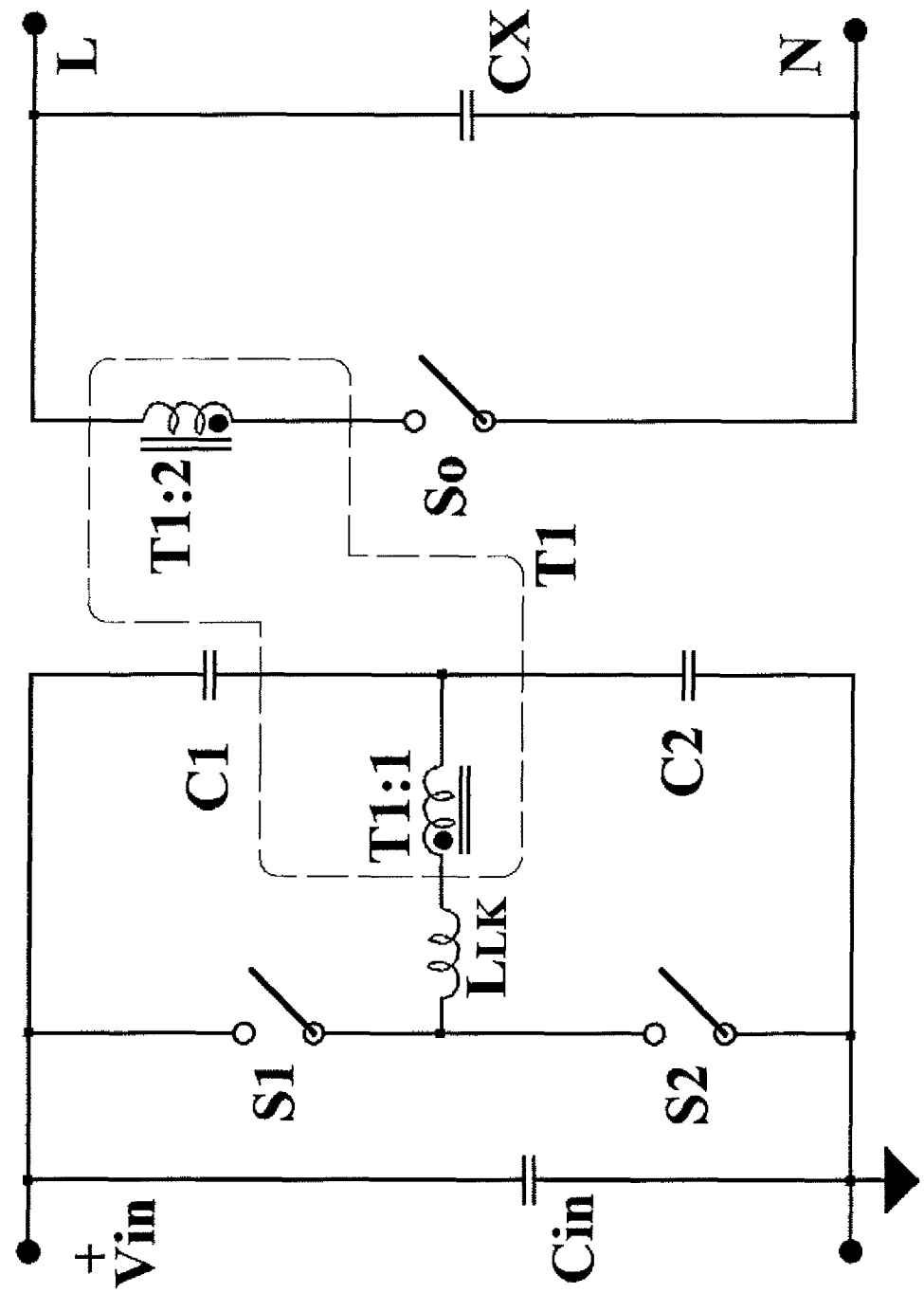
FIG. 3 introduces schematically the concept of a Resonant Bi-directional DC-AC converter, according to the present invention.

FIG. 3 introduces schematically the concept of a Resonant Bi-directional DC-AC converter, according to the present invention, where a ideal magnetic transformer T1 has a primary winding T1:1 connected with the non-dotted end to the capacitors C1 and C2, first part of a half-bridge structure, and with the dotted end connected to an small value inductor $L_{LK}$, which is further connected to the switches S1 and S2, second part of the said half-bridge structure. The $L_{LK}$ inductor present in series with the primary winding T1:1 represents the total parasitic inductance of a real transformer, namely leakage inductance, which is usually much smaller than the inductance of the primary winding T1:1. A high value DC capacitor Cin is placed between the (+) and (−) input ports of the DC-AC converter, its purpose being the filtering of the input current at twice the minimum AC line frequency, and a low value AC capacitor Cx is placed between the two phases of the AC line in order to filter the high frequency noise of the AC-DC stage.

The primary side of the structure herein presented is a double ended type, with symmetrical operation capability. The secondary side structure is a single ended type, with bi-directional capability. S1 and S2 switches are alternatively turning ON and OFF at high frequency, with the switch So having the capability to be synchronized with either S1 or S2.

The output voltage of the DC-AC stage can be either positive or negative, depending on synchronization mode of So. Considering the transformer T1 windings polarity of FIG. 3, the L phase polarity is positive and N phase polarity is negative when So is synchronized with S2; in opposition, the N phase polarity is positive and L phase polarity is negative when So is synchronized with S1. The DC-AC stage proposed herein can generate both voltage polarities, being capable to provide an AC voltage signal at its output; hence an unfolding bridge is not necessary.

Assuming a positive polarity for L phase and negative polarity for N phase, the switches S2 and So are OFF (open) when the switch S1 is ON (closed), situation defined as State A, and during this state the energy is flowing from the input capacitor Cin to the transformer T1 (T1:1 winding) through C1 and C2 capacitors. This process transfers energy in both the transformer T1 (magnetizing energy) and C1 and C2 capacitors. The influence of L$_{LK}$ inductor is negligible in this process, as its value is very small. The state described above is presented in FIG. 4a).

Once S1 is turned OFF, the magnetizing energy accumulated into the transformer will naturally change the polarity of the transformer, moment when the switch S2 is turned ON, shortly followed by the activation of So (ON), situation defined as State B. This is the state when the energy is delivered to the output, as presented in FIG. 4b). The energy accumulated in T1 and C1 and C2 capacitors is transferred to the output in a resonant way (LLC type). The L$_{LK}$ inductor play a major role here, as the shape of the current into transformer is produced by the resonance between L$_{LK}$ inductance and the sum of C1 and C2 capacitance. The resonance frequency is given by:

$$Fr = \frac{1}{2\pi * \sqrt{L_{LK}(C1+C2)}}. \quad (1)$$

The perfect energy transfer appears when the State B period matches the semi-period of the resonance frequency Fr:

$$T_B = \pi * \sqrt{L_{LK}(C1+C2)} \quad (2).$$

Figure 5:
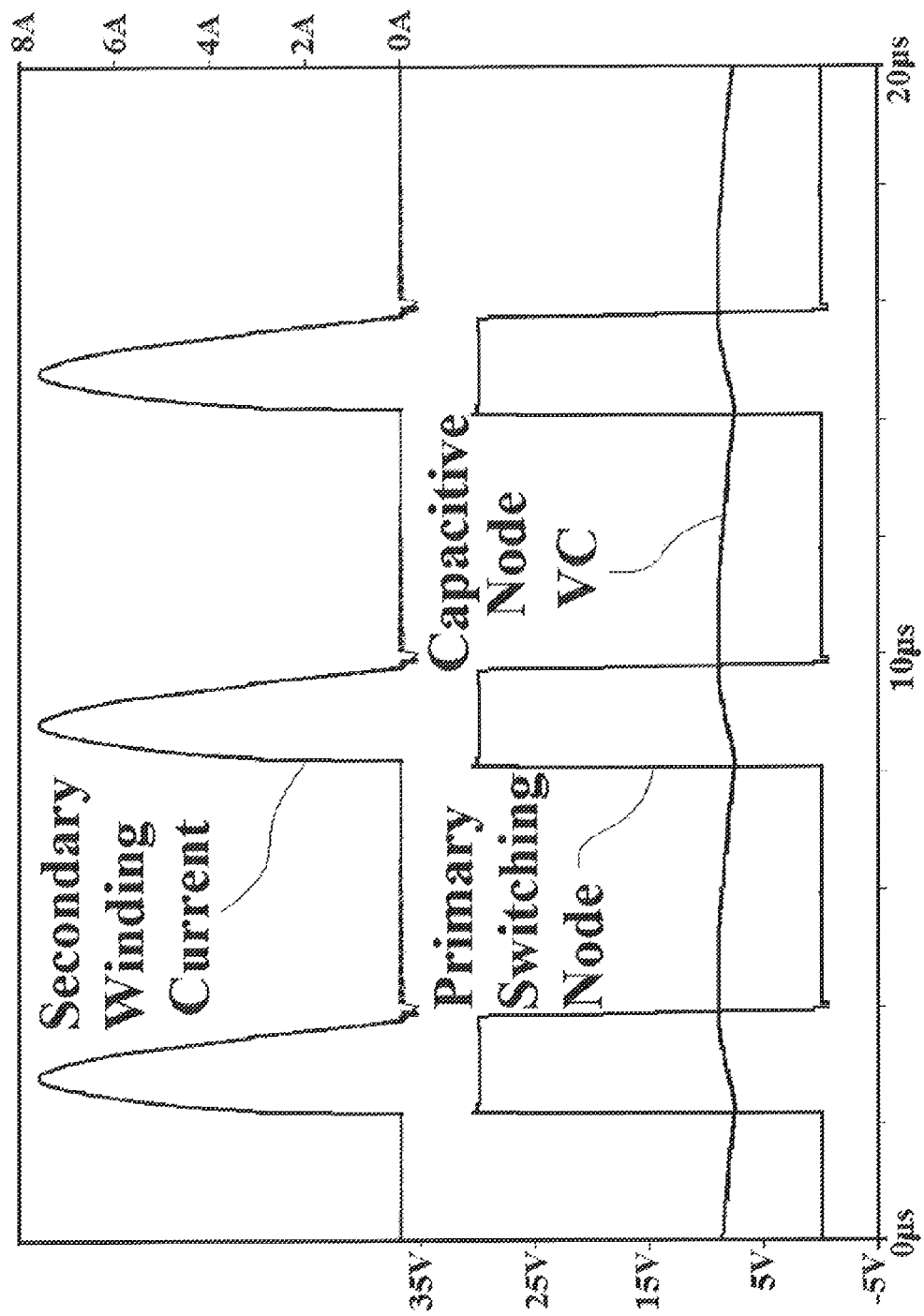
FIGS. 5 and 6 show the main waveforms of the operation of the circuitry of FIG. 3, as described herein.
Figure 6:
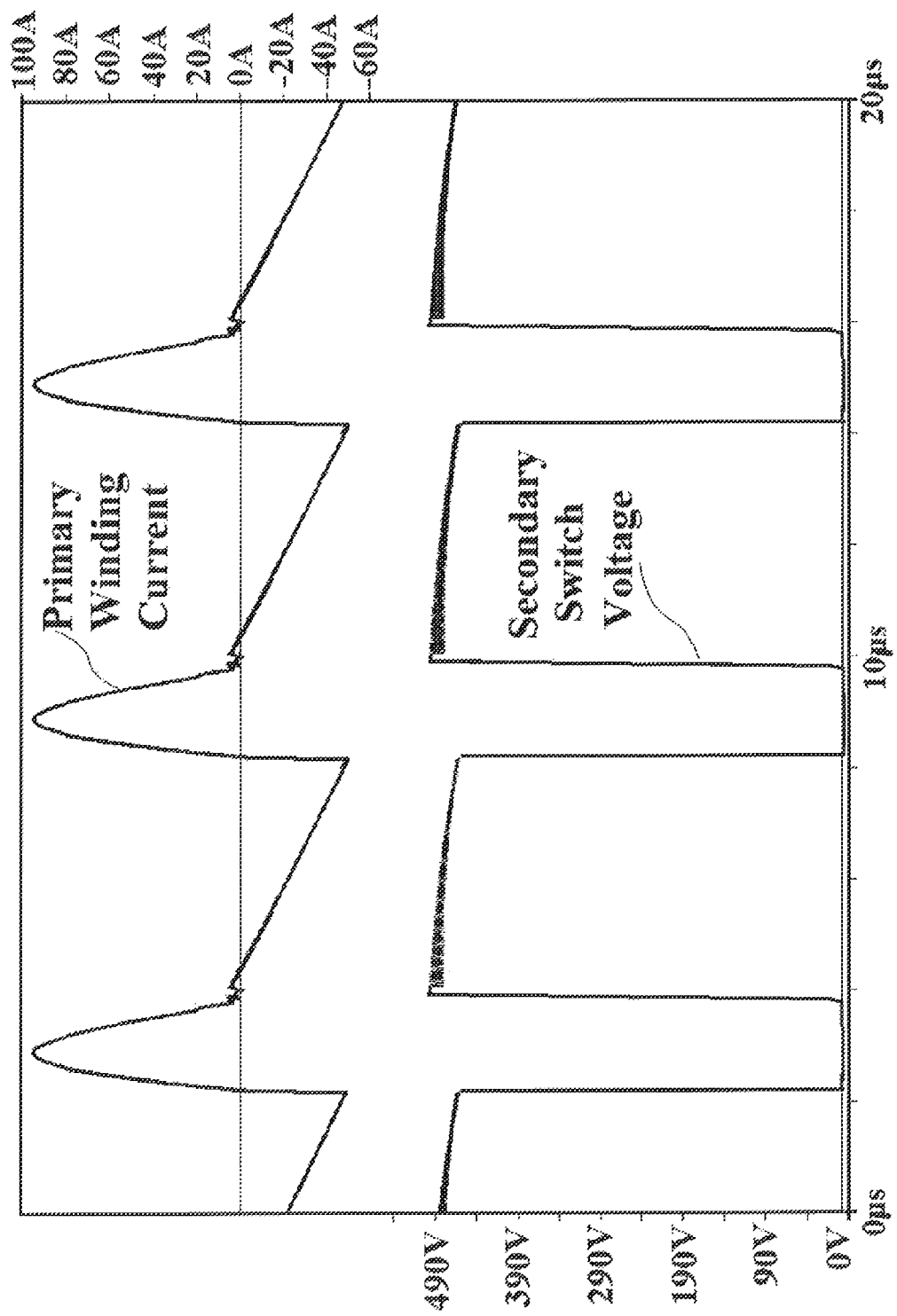

Therefore $T_B$ is the duration of State B that optimizes the energy transfer to the output; varying the duration of State A ($T_A$) will control the output level voltage. The functioning of the switching power supply is reduced to an alternative succession of the states A and B. FIG. 5 and FIG. 6 show the main waveforms of the operation described above, assuming 30 Vdc input, a turns ratio for T1 transformer N=1:16, 340 Vdc output voltage, 460 W output power and 166 kHz switching frequency. For the purpose of this presentation the mode of operation described above is named MOD1.

Assuming a positive polarity for N phase and negative polarity for P phase, the switches S1 and So are OFF (open) when the switch S2 is ON (closed), situation defined as State C, and during this state the energy is flowing from the input capacitor Cin to the transformer T1 (T1:1 winding) through C1 and C2 capacitors. This process transfers energy in both the transformer T1 (magnetizing energy) and C1 and C2 capacitors. The influence of L$_{LK}$ inductor is negligible in this process, as its value is very small. The state described above is presented in FIG. 7a).

Once S2 is turned OFF, the magnetizing energy accumulated into the transformer will naturally change the polarity of the transformer, at the moment when the switch S1 is turned ON, shortly followed by the activation of So (ON), situation defined as State D. This is the state when the energy is delivered to the output, as presented in FIG. 7b). The energy accumulated in T1 and C1 and C2 capacitors during is transferred to the output in a resonant way (LLC type). The L$_{LK}$ inductor plays a major role here, at the shape of the current into transformer is produced by the resonance between L$_{LK}$ inductance and the sum of C1 and C2 capacitance. The resonance frequency is given by formula (1) as in State B, and:

$$T_D = \pi * \sqrt{L_{LK}(C1+C2)} \quad (3).$$

Therefore $T_D$ is the duration of State D that optimizes the energy transfer to the output; varying the duration of State C ($T_C$) will control the output level voltage. The function of the switching power supply is reduced to an alternative succession of the states A and B. It is obvious that there is a perfect correspondence between the operation in A/B sequence and C/D sequence, the only difference being the polarity of the output voltage. The main waveforms of the operation described above, assuming 30 Vdc input, a turn ratio for T1 transformer N=1:16, 340 Vdc output voltage, 460 W output power and 166 kHz switching frequency are similar with those of FIG. 5 and FIG. 6. For the purpose of this presentation the mod of operation described above is named MOD2.

Figure 8:
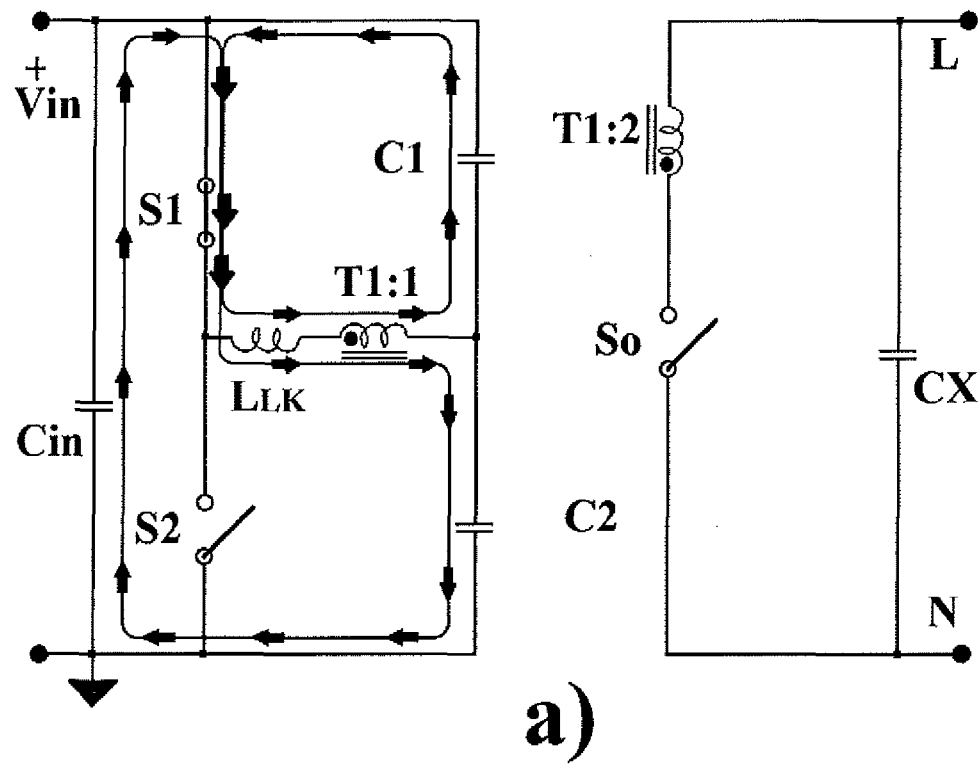
FIGS. 8a and 8b illustrate still another state of the circuitry of the invention, as described herein.
Figure 8:
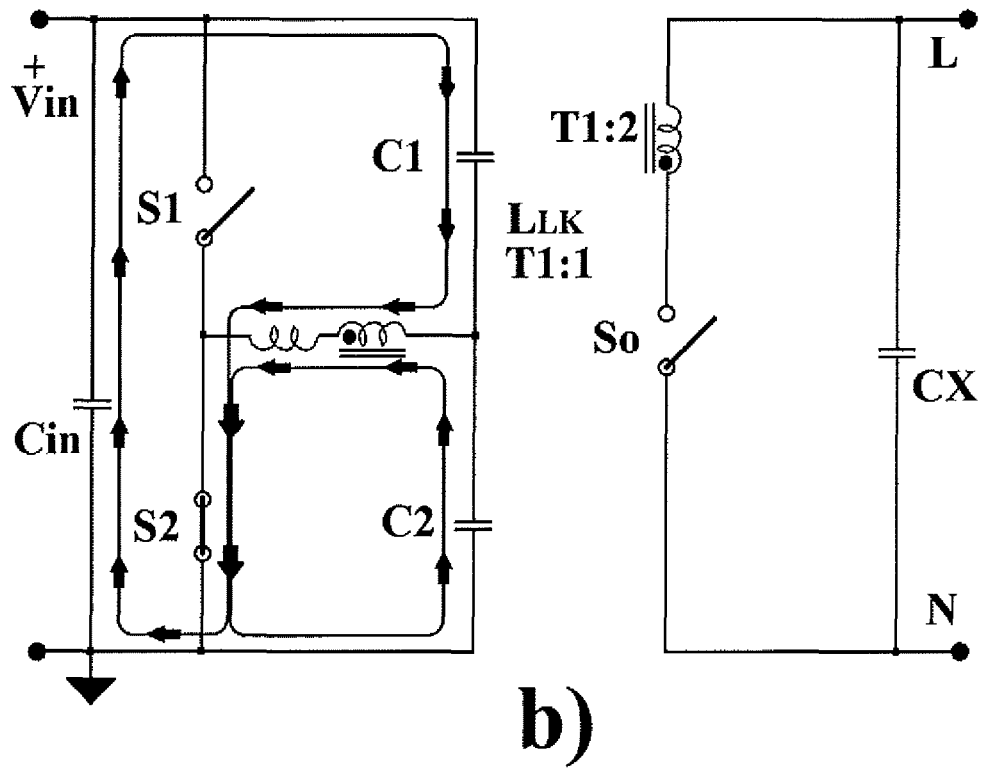

There is a third mode of operation for the proposed Resonant Bi-directional DC-AC converter, where a sequence of alternative succession of the states A (S1 ON, S2 and So OFF), presented in FIG. 8a), and C (S2 ON, S1 and So OFF), presented in FIG. 8b), is used. So switch being continuously OFF, there is no power transfer to the output, and the polarity and amplitude of the output voltage does not matter. The energy is re-circulated between T1 transformer and C1 and C1 capacitive leg of the half-bridge.

The ratio between $T_A$ and $T_C$ produces the average voltage level across C1, respective C2, achieving control of the voltage of the capacitive node VC of the half-bridge. The influence of L$_{LK}$ is negligible in this mode of operation, the resonant effect being insignificant. Therefore there is no constraining on the $T_A$ and $T_C$ periods. For the purpose of this presentation the mode of operation described above is named MOD3.

The output voltage level when operating in MOD1 and, similarly, in MOD2 is determined by the $T_A$ and $T_B$, respectively $T_C$ and $T_D$. For the same absolute value of the output voltage we can assume $T_A = T_C$ and $T_B = T_D$, hence the switching period Ts is:

$$Ts = T_A + T_B = T_C + T_D \quad (4)$$

Calculating the output relationship with $T_A$ and $T_B$ for the positive polarity of the output voltage will automatically give the answer for the negative polarity by substituting $T_A$ with $T_C$ and $T_B$ with $T_D$. The DC input voltage is equal with sum of the C1 and C2 voltages:

$$V\text{in} = V_{C1} + V_{C2} \quad (5).$$

One can define the duty-cycle for states A and B in respect of Ts as:

$$d_A = T_A/Ts \text{ and } d_B = T_B/Ts \quad (6).$$

The resulting relation between output voltage Vac and duty cycle is:

$$d_A = Vac*N/V\text{in} \text{ or } Vac = d_A*V\text{in}/N \quad (7).$$

The output voltage is in fact the AC grid voltage, hence it follows a sinusoidal function, $Vac = V_{MAX}*\sin(2\pi F_L t)$, where $V_{MAX}$ is the peak voltage of the AC line, $F_L$ is the AC line frequency and t is the time. This leads to the duty-cycle equation:

$$d_A = N*V_{MAX}*\sin(2\pi F_L t)/V\text{in} \quad (8).$$

From the fact that $d_B$ is equal with (1−$d_A$), one can conclude that:

$$d_B = 1 - [N*V_{MAX}*\sin(2\pi F_L t)/V\text{in}] \quad (9).$$

The State B duration $T_B$ is defined by Equation (2) and for a given DC-AC converter is constant, leading to the optimal switching frequency given by:

$$F_S = d_B / T_B \qquad (10)$$

or $$F_S = \frac{1 - [N * V_{MAX} * \sin(2\pi F_L t) / Vin]}{T_B}.$$

The DC-AC converter proposed herein works at variable frequency in order to deliver the AC line voltage. The peak AC line voltage that can be produced is limited by the fact that the primary side reflected output voltage has to be smaller than the input voltage:

$$N * V_{MAX} < Vin \qquad (11).$$

Due to the symmetry of operation between states A and C, respectively B and D, and keeping in mind that $T_B$ is equal to $T_D$ for a optimal operation, based on Formulae (2) and (3), it is obvious that for the negative polarity of the AC line all the equations remain true by replacing $d_A$ with $d_C$ and $d_B$ with $d_D$.

For a normal AC-DC converter, the power transfer reaches zero when the AC line voltage is crossing zero voltage; in fact the switching operation of the converter can be suspended for a line voltage close to zero without any significant impact on the performance. The Resonant Bi-directional DC-AC circuitry presented herein takes advantage of this "near zero crossing" area of the AC line voltage to change to the third mode of operation described above (MOD3), where the switching of the converter is resumed to an alternating succession of the states A (S1 ON, S2 and So OFF) and C (S2 ON, S1 and So OFF).

During MOD3 mode of operation there is no power transfer to the output and the energy is re-circulated between C1, C1 and T1; by varying the duty-cycles $d_A$ and $d_C$, the position of the voltage of the capacitive node VC of the half-bridge is varied. The influence of $L_{LK}$ is negligible in this mode of operation, the resonant effect being insignificant. Therefore there is no constraining on the $T_A$ and $T_C$ periods.

Figure 9:
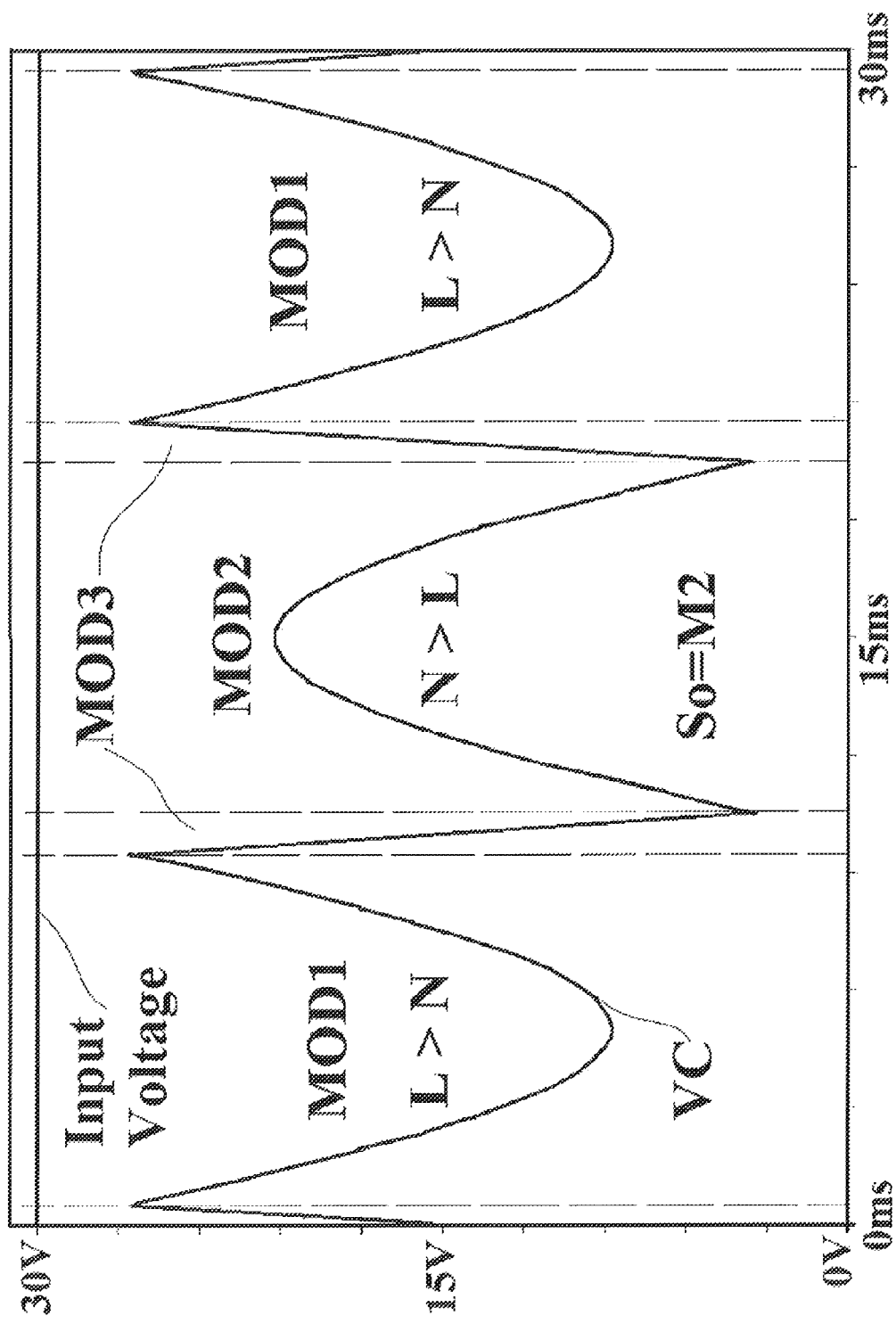
FIG. 9 illustrates features of the circuitry, during one of its modes of operation, as described herein.

MOD3 allows the reposition of the VC node from its location at the end of the previous AC line semi-cycle (e.g. positive polarity phase) to the location of the start for the following AC line semi-cycle (e.g. negative polarity phase), as shown in FIG. 9. The position of VC voltage is given by:

$$VC = Vin * (1 - d_A) = Vin * d_C \qquad (12).$$

The sequence of alternation among MOD1, MOD3, MOD2, and MOD3 modes of operation allow the DC-AC converter to produce an output well matched with the AC line.

A further improvement of the concept introduce in FIG. 3 comprises the use of three windings transformer for T1, where T1 has a primary winding T1:1 connected with the non-dotted end to the capacitors C1 and C2, first part of a half-bridge structure, and with the dotted end connected to an small value inductor $L_{LK}$, which is further connected to the switches S1 and S2, second part of the said half-bridge structure. T1 has two identical secondary windings T1:2 and T1:3, as presented in FIG. 10.

T1:2 winding is connected with the non-dotted end to the L side of the AC line and with the dotted end to the first side of the switch So, while T1:3 winding is connected with the non-dotted end to the second side of the switch So and with the dotted end to the N side of the AC line. The turns ratio of the transformer is given by the ratio between the T1:1 winding turns and the sum of winding turns of T1:2 and T1:3. The $L_{LK}$ inductor present in series with the primary winding T1:1 represents the total parasitic inductance of a real transformer, namely leakage inductance, which is usually much smaller than the inductance of the primary winding T1:1.

The operation of the DC-AC converter is completely identical with that described previously, with the only benefit that the high frequency noise induced inside the transformer T1 by the switching of the converter is canceled by the opposite movements of T1:2 dotted end and T1:3 non-dotted end, because T1:2 and T1:3 have the same number of turns. The common mode noise of the transformer is reduced significantly.

Resonant Bi-Directional DC-AC Preferred Embodiment

Figure 10:
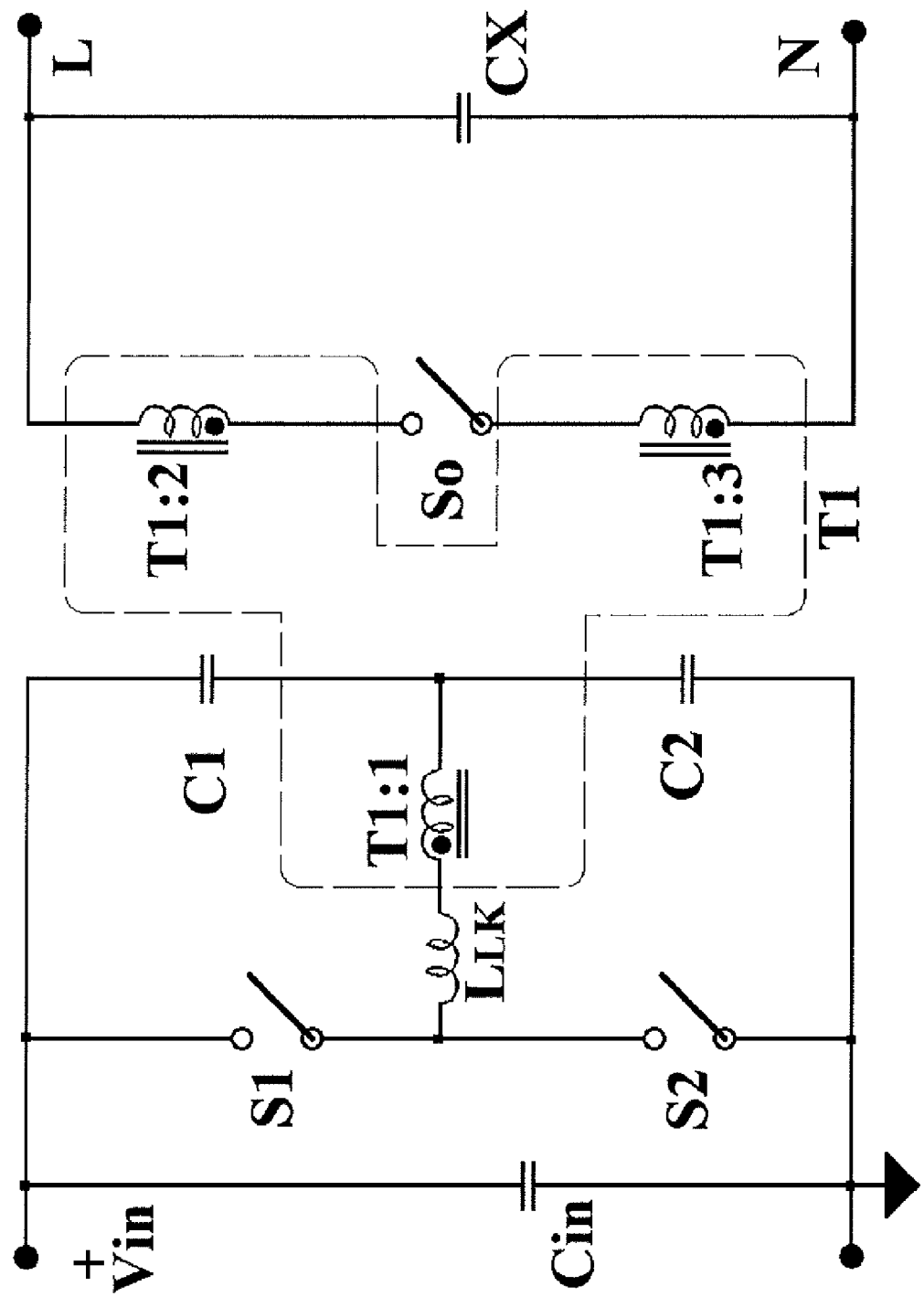
FIG. 10 presents another embodiment of the Resonant Bi-directional circuitry.
Figure 11:
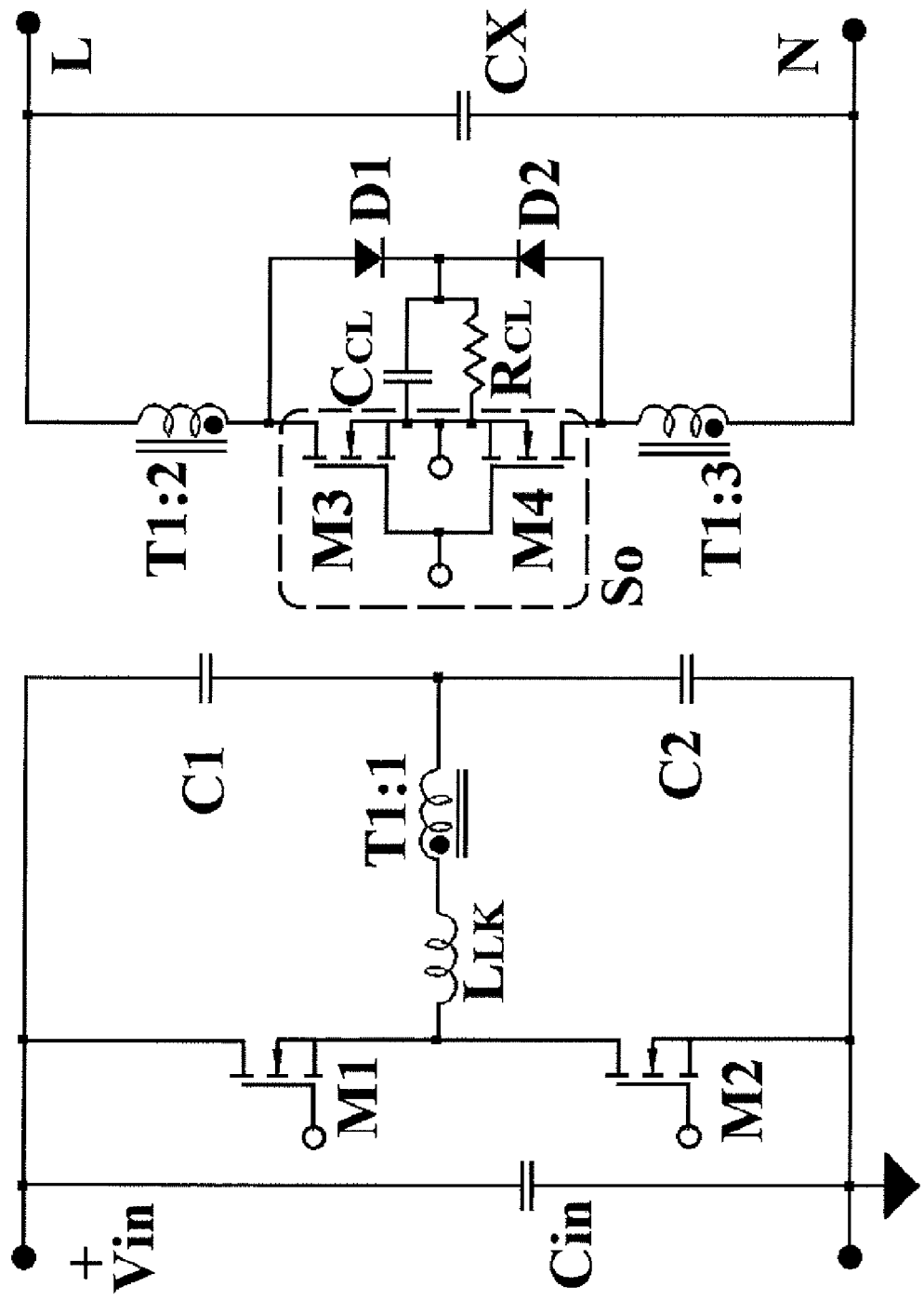
FIG. 11 presents the preferred embodiment of the Resonant Bi-directional circuitry, as introduced in FIG. 10.

FIG. 11 presents the preferred embodiment of the Resonant Bi-directional circuitry as introduced in FIG. 10. An magnetic transformer T1 has a primary winding T1:1 connected with the non-dotted end to the capacitors C1 and C2, first part of a half-bridge structure, and with the dotted end connected to an small value inductor $L_{LK}$, which is further connected to the Mosfet switchers M1 and M2, second part of the said half-bridge structure. The T1 transformer has two identical secondary windings T1:2 and T1:3. T1:2 winding is connected with the non-dotted end to the L phase of the AC line and with the dotted end to the drain of M3 Mosfet, part of ideal switch So, while T1:3 winding is connected with the non-dotted end to the drain of M4 Mosfet, part of ideal switch So, and with the dotted end to the N phase of the AC line. The turn-ratio of the transformer is given by the ratio between the T1:1 winding turns and the sum of winding turns of T1:2 and T1:3.

M3 and M4 mosfets form and ideal switch So, having their two source ports connected together; their two gate ports are also connected together, hence a single control signal applied between the common gate and common source ports turns ON and OFF the ideal switch So. A RCD type of clamp is constructed by $C_{CL}$, $R_{CL}$, and D1 and D2, its purpose being the clamping of any high voltage spikes across So switch. Each of D1 and D2 are working alternatively on one of the AC output phase; D1 is active at the converter switching frequency when the output polarity is positive, while D2 is active at the converter switching frequency when the output polarity is negative.

$L_{LK}$ inductor in practical designs can be a stand-alone inductor or can represent the total parasitic inductance of a real transformer, namely leakage inductance, which is usually much smaller than the inductance of the primary winding T1:1.

A high value DC capacitor Cin is placed between the (+) and (−) input ports of the DC-AC converter, its purpose being the filtering of the input current at 100 Hz (twice the minimum AC line frequency), and a low value AC capacitor Cx is placed between the two phases of the AC line in order to filter the high frequency noise of the AC-DC stage.

Figure 4:
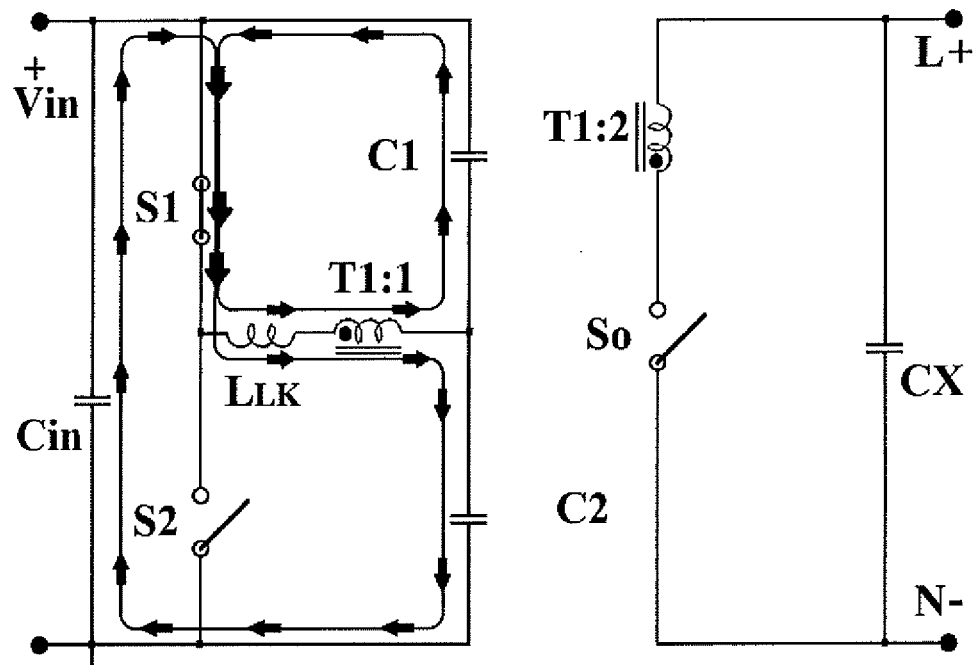
FIGS. 4a and 4b illustrate certain states of the circuitry of FIG. 3, as described herein.
Figure 4:
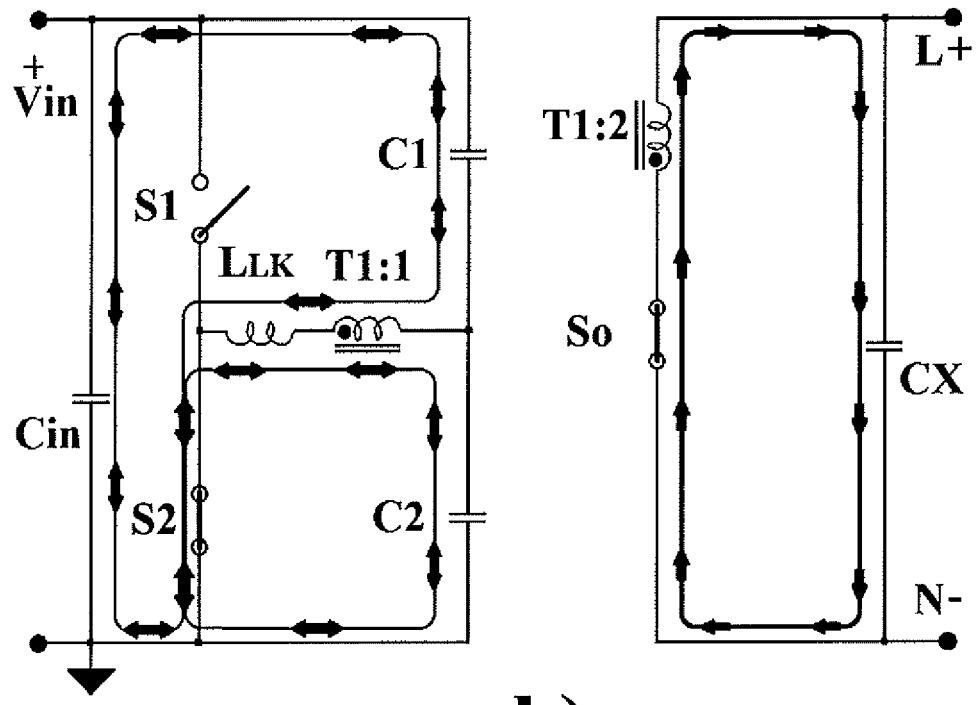
Figure 7:
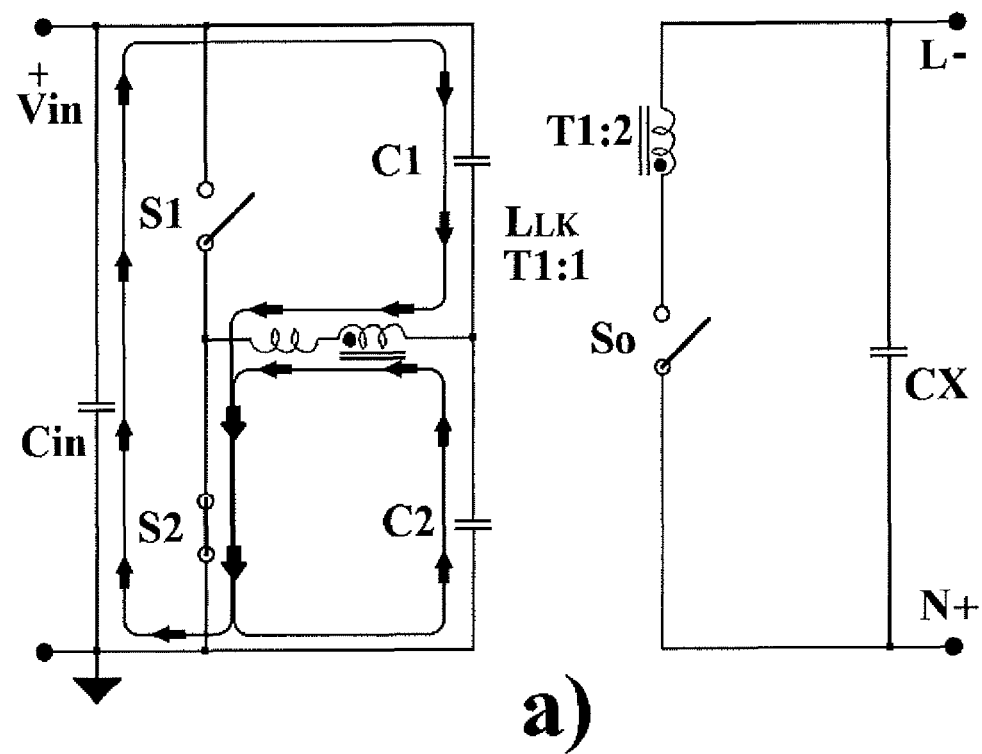
FIGS. 7a and 7b illustrate another state of the circuitry of the invention, as described herein.
Figure 7:
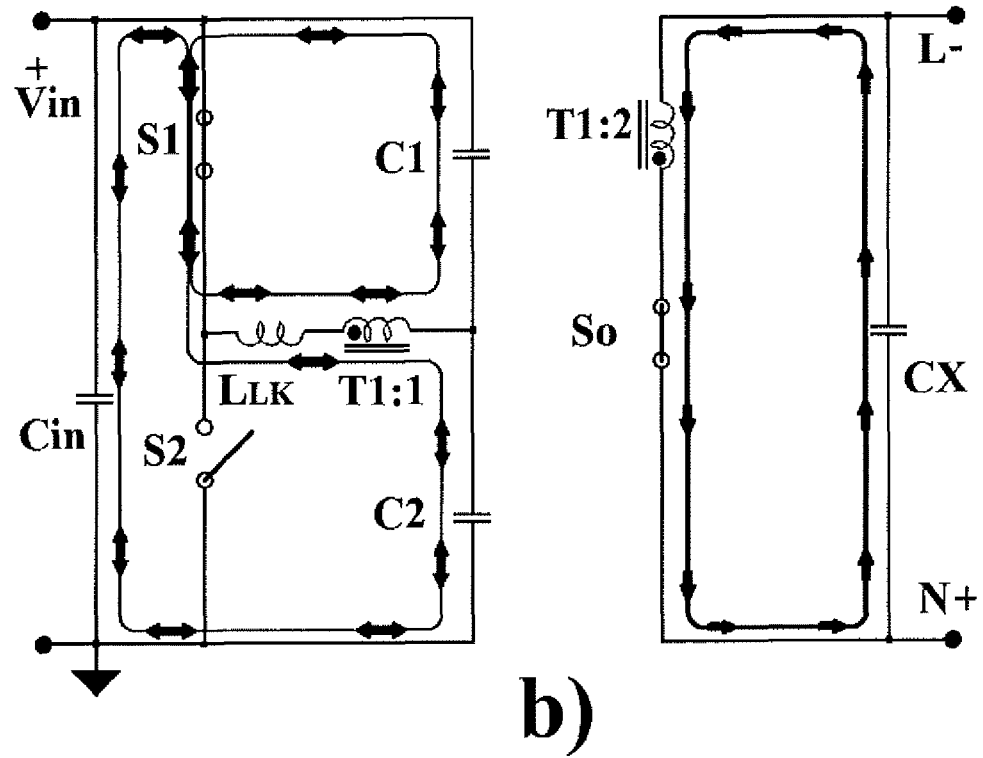

The operation of the preferred embodiment follows close the MOD1, MOD2 and MOD3 modes of operation for the Resonant Bi-directional DC-AC circuitry, as presented in FIGS. 4a) and b), for the positive output voltage, in FIGS. 7a) and b), for the negative output voltage, and in FIGS. 8a) and b), for the crossing zero output voltage.

The control algorithm is that described by the formulae (8), (9) and (10) for MOD1 and MOD2 operation, and by formula (12) for MOD3 operation.

Hence during MOD1, the switches M2 and So are OFF when the switch M1 is ON (State A), and during this state the energy is flowing from the input capacitor Cin to the transformer T1 (T1:1 winding) through C1 and C2 capacitors. This process transfers energy in both the transformer T1 (magnetizing energy) and C1 and C2 capacitors. The influence of L$_{LK}$ inductor is negligible in this process, as its value is very small.

Once M1 is turned OFF, the magnetizing energy accumulated into the transformer will naturally change the polarity of the transformer, at the moment when the switch M2 is turned ON, shortly followed by the activation of So (ON) (State B). This is the state when the energy is delivered to the output. The energy accumulated in T1 and C1 and C2 capacitors is transferred to the output in a resonant way (LLC type). The L$_{LK}$ inductor play a major role here, as the shape of the current into transformer is produced by the resonance between L$_{LK}$ inductance and the sum of C1 and C2 capacitance, Formula (1).

T$_B$ is the duration of State B that optimizes the energy transfer to the output and is given by Formula (2); varying the duration of State A (T$_A$) will control the output level voltage. The function of the switching power supply is reduced to an alternative succession of the states A and B. The main waveforms are similar with those presented by FIG. 5 and FIG. 6, assuming 30 Vdc input, a turn ratio for T1 transformer N=1:16, 340 Vdc output voltage, 460 W output power and 166 kHz switching frequency.

During MOD2, the switches M1 and So are OFF when the switch M2 is ON (State C), and during this state the energy is flowing from the input capacitor Cin to the transformer T1 (T1:1 winding) through C1 and C2 capacitors. This process transfers energy in both the transformer T1 (magnetizing energy) and C1 and C2 capacitors. The influence of L$_{LK}$ inductor is negligible in this process, as its value is very small.

Once M2 is turned OFF, the magnetizing energy accumulated into the transformer will naturally change the polarity of the transformer, moment when the switch M1 is turned ON, shortly followed by the activation of So (ON) (State D). This is the state when the energy is delivered to the output. The energy accumulated in T1 and C1 and C2 capacitors is transferred to the output in a resonant way (LLC type). The L$_{LK}$ inductor plays a major role here, as the shape of the current into transformer is produced by the resonance between L$_{LK}$ inductance and the sum of C1 and C2 capacitance, Formula (1).

T$_D$ is the duration of State D that optimizes the energy transfer to the output and is given by Formula (3); varying the duration of State B (T$_B$) will control the output level voltage. The function of the switching power supply is reduced to an alternative succession of the states C and D. The main waveforms are similar with those presented by FIG. 5 and FIG. 6, assuming 30 Vdc input, a turn ratio for T1 transformer N=1:16, 340 Vdc output voltage, 460 W output power and 166 kHz switching frequency.

During MOD3 mode of operation there is no power transfer to the output and the energy is re-circulated between C1, C1 and T1; by varying the duty-cycles d$_A$ and d$_C$, the position of the voltage of the capacitive node VC of the half-bridge is varied. The influence of L$_{LK}$ is negligible in this mode of operation, the resonant effect being insignificant. Therefore there is no constraining on the T$_A$ and T$_C$ periods.

MOD3 allows the reposition of the VC node from its location at the end of the previous AC line semi-cycle (e.g. positive polarity phase) to the location of the start for the following AC line semi-cycle (e.g. negative polarity phase), as shown in FIG. 9. The position of VC voltage is given by Formula (12).

The sequence of alternation among MOD1, MOD3, MOD2, and MOD3 modes of operation allow the DC-AC converter of the preferred embodiment to produce an output well matched with the AC line.

Thus, the foregoing description shows and describes circuitry for DC to AC conversion using resonant bi-directional single stage, comprising a magnetic transformer T1 that has a primary winding T1:1 connected with a non-dotted end to capacitors C1 and C2 that form the first part of a half-bridge structure, and with a dotted end connected to an small value inductor L$_{LK}$, which is further connected to switches S1 and S2 that form a second part of the said half-bridge structure, and where the T1 transformer has a secondary winding T1:2 connected with the non-dotted end to an AC line phase L and with the dotted end to an output switch So that makes the connection with an AC line phase N. Also, the foregoing description and drawings provide circuitry for DC to AC conversion using resonant bi-directional single stage, where a magnetic transformer T1 has a primary winding T1:1 connected with the non-dotted end to capacitors C1 and C2 forming the first part of a half-bridge structure, and with the dotted end connected to an small value inductor L$_{LK}$, which is further connected to switches S1 and S2 forming the second part of the said half-bridge structure, where T1 transformer has two identical windings T1:2 and T1:3, with T1:2 winding being connected with the non-dotted end to the L side of an AC line and with the dotted end to the first side of a switch So, while T1:3 winding is connected with the non-dotted end to the second side of the switch So and with the dotted end to the N side of the AC line.

With the foregoing description in mind various ways of providing circuitry in which a new bi-directional single stage concept, which eliminates the unfolding bridge, maintains soft-switching of the active devices during operation, delivering the output power in a resonant way, reduces the common mode noise of the transformer, and increases the overall efficiency, will be apparent to those in the art.

The invention claimed is:

1. Circuitry for DC to AC conversion, comprising:
    a DC input;
    an AC output; and
    a resonant bidirectional single stage coupling the DC input to the AC output, said resonant bidirectional single stage comprising a magnetic transformer T1 that has a primary winding T1:1 connected with a non-dotted end to capacitors C1 and C2 forming a first part of a half-bridge structure, and with a dotted end connected to inductor LLK, which is further connected to switches S1 and S2 forming a second part of the said half-bridge structure, where the T1 transformer has a secondary winding T1:2 connected with a non-dotted end to an AC line phase L and with a dotted end to an output switch So that makes a connection with an AC line phase N.

2. The circuitry of claim 1, where depending on a polarity of an AC output voltage the So output switch is synchronized with the one or the other of S1 or S2 switches.

3. The circuitry of claim 1, where during output AC voltage zero crossing periods, the output switch So is maintained OFF and a voltage of a capacitive node of a primary bridge (VC) is moved from a last position at an end of a previous AC line semi-cycle to a starting position of a next AC line semi-cycle, by means of varying a switching time of S1 and S2 primary switches.

4. Circuitry for DC to AC conversion, comprising:
    a DC input;

an AC output; and a resonant bidirectional single stage coupling the DC input to the AC output, said resonant bidirectional single stage, comprising a magnetic transformer T1 that has a primary winding T1:1 connected with a non-dotted end to capacitors C1 and C2 forming a first part of a half-bridge structure, and with a dotted end connected to an inductor LLK, which is further connected to switches S1 and S2 forming a second part of the said half-bridge structure, where T1 transformer has two identical windings T1:2 and T1:3, with the T1:2 winding being connected with a non-dotted end to an L side of an AC line and with a dotted end to a first side of the switch So, while the T1:3 winding is connected with a non-dotted end to a second side of the switch So and with a dotted end to an N side of the AC line.

5. The circuitry of claim 4, where depending on a polarity of an AC output voltage the So output switch is synchronized with the one or the other of S1 or S2 primary switches.

6. The circuitry of claim 4, where during output AC voltage zero crossing periods, the output switch So is maintained OFF and a voltage of a capacitive node of a primary bridge (VC) is moved from a last position at an end of a previous AC line semi-cycle to a starting position of a next AC line semi-cycle, by means of varying a switching time of S1 and S2 primary switches.

* * * * *